US007619622B2

(12) United States Patent
de Souza et al.

(10) Patent No.: US 7,619,622 B2
(45) Date of Patent: Nov. 17, 2009

(54) SELECTIVE RENDERING FOR DRIVER CLASSES

(75) Inventors: Jeremy de Souza, Redmond, WA (US); Pravin K. Santiago, Issaquah, WA (US); Stephen H. Wright, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 425 days.

(21) Appl. No.: 11/395,684

(22) Filed: Mar. 31, 2006

(65) Prior Publication Data

US 2007/0229505 A1    Oct. 4, 2007

(51) Int. Cl.
*G06F 17/00* (2006.01)
*G06F 15/16* (2006.01)
*G06T 1/00* (2006.01)
*G09G 5/00* (2006.01)
*G06K 9/62* (2006.01)
*G06K 9/40* (2006.01)
*G06F 3/048* (2006.01)

(52) U.S. Cl. ............. 345/418; 345/581; 345/502; 345/522; 382/224; 382/254; 382/260; 715/781

(58) Field of Classification Search .......... 345/418, 345/441, 581, 428, 501–503, 506, 520, 522; 382/224, 254, 260, 274, 276, 303; 715/781–784, 715/273, 759, 803–806

See application file for complete search history.

(56) References Cited

U.S. PATENT DOCUMENTS

| 5,523,769 | A |  | 6/1996 | Lauer et al. |
| 6,404,428 | B1 |  | 6/2002 | Radecki et al. |
| 6,704,021 | B1 |  | 3/2004 | Rogers et al. |
| 2002/0145611 | A1 | * | 10/2002 | Dye et al. .......... 345/543 |
| 2005/0162434 | A1 |  | 7/2005 | Hancocok et al. |
| 2007/0112476 | A1 | * | 5/2007 | Obradovich ........ 701/1 |

* cited by examiner

*Primary Examiner*—Wesner Sajous
(74) *Attorney, Agent, or Firm*—Workman Nydegger (57) ABSTRACT

Described is a filtering mechanism/process that selectively controls whether graphics primitives are provided to a given driver. For example, graphics primitives of an accessibility (e.g., magnification) program may be excluded from being obtained by mirror drivers associated with the accessibility programs, so that the mirror drivers receive only the primitives of unmagnified windows. A registration mechanism allows a program to identify its window as being associated with a class of drivers for filtering, and the drivers may identify themselves as being of the class. By maintaining data that associates windows with a class of drivers, when graphics primitives associated with a registered window are received, a filtering operation be activated to determine which graphics primitives are provided to which driver or drivers. Filtering may be by exclusion to prevent certain primitives from being obtained by excluded drivers, or by inclusion whereby only included drivers receive certain primitives.

20 Claims, 4 Drawing Sheets

SELECTIVE RENDERING FOR DRIVER CLASSES

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND

Contemporary computer systems offer users the ability to magnify a portion of their display screen, typically for providing visually-impaired users with better accessibility to computers, although also offering mainstream users the benefit of magnification in certain contexts. In general, when the user runs a magnifier, a magnification window is opened and the magnified content displayed in that window. The user can adjust the magnification window in size and position, adjust the magnification level, and possibly choose other effects, e.g., color inversion. One such magnifier program operates by driver hooking, to intercept graphics calls sent towards the video driver, essentially in a screen capture operation, where the magnifier program then scales up a corresponding graphics image in the magnification window.

Many existing accessibility applications generally used chained display drivers to implement magnifiers; for example a Windows® Driver model (WDM) chained display driver is a kernel mode video driver. Programs provided by accessibility (or assisted) technology vendors (ATVs) draw the magnifier window from the driver directly to the display device. This means that the driver's rendering primitives (e.g., DrvXXX, where Graphics DDI, Device Driver Interface, function names are in the DrvXxx form) associated with the magnification window handle (HWND) are not present in the rendering stream intercepted by the chained display driver.

An alternative accessibility technology is described in U.S. patent application Ser. No. 11/180,859, filed Jul. 12, 2005, assigned to the assignee of the present invention and hereby incorporated by reference, which is (among its aspects) generally directed to a magnification engine and API (application programming interface) that renders a magnifier in software and/or hardware. This API technology may be used in conjunction with a non-chained driver model that instead uses accessibility mirror drivers that are attached to the primary display driver, essentially as peers of the primary display driver rather than being above the primary display driver in the rendering path.

Many assistive technology products are combined magnifier/screen reader products that will use mirror drivers and the magnification API. Such products, as well as standalone screen readers are intended to be able to able to describe the area under a magnifier.

However, regardless of whether rendered via software or hardware, the full set of graphics primitives are present in the rendering stream that is sent to the primary display driver. As a result, and because the magnifier window is generally topmost and layered, accessibility code that is in the mirror drivers are unable to distinguish or locate which primitives for the screen are under the magnifier window. This results in an unacceptable blind spot problem in off-screen models, that is, display models built from the primitives that are then used to provide actual display data.

By way of example, the shift from chained display drivers to accessibility mirror drivers and the magnification API/engine cause magnifier windows to obscure rendering information from accessibility applications, such as screen readers. When this happens, the screen readers cannot describe the screen content that is under a magnifier window. At an extreme, if the magnifier was full-screen, the screen reader would not be able to read anything because of the above-described blind spot problem.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a filtering mechanism that selectively controls whether graphics primitives are provided to a given driver, based on a window identifier associated with the graphics primitives, a set of one or more registered windows, and whether that given driver belongs to a particular class of drivers. In general, a registration mechanism maintains registration information that is used to match window handles to a certain class of drivers.

By maintaining data that associates one or more windows with a class of drivers, when graphics primitives associated with a window are received, a filtering operation can determine which graphics primitives are provided to which driver or drivers. Filtering may be by exclusion to prevent certain primitives from being obtained by excluded drivers, or by inclusion such that only included drivers receive certain primitives.

Other advantages will become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Exemplary Operating Environment

Figure 1:
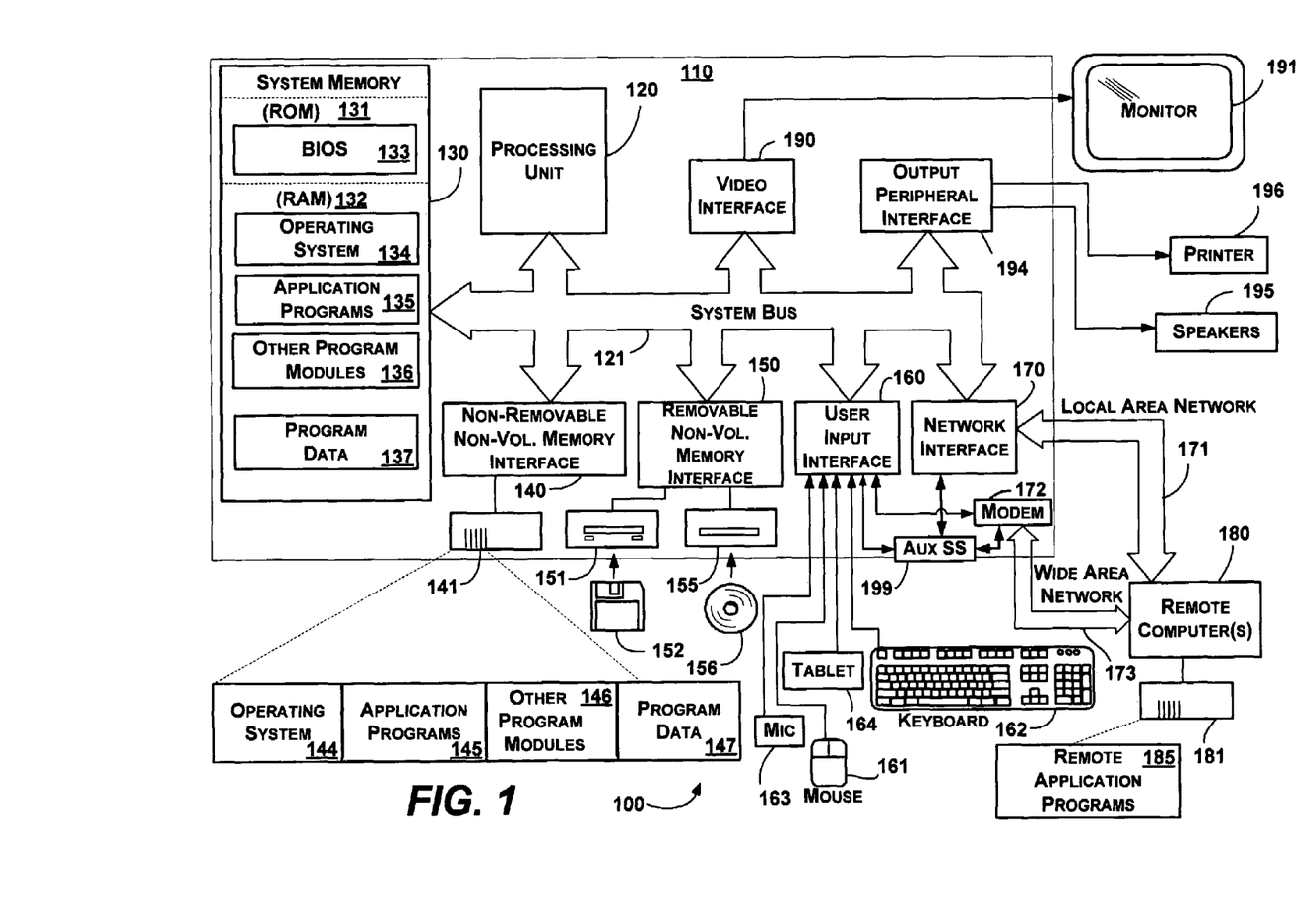
FIG. 1 shows an illustrative example of a general-purpose computing environment into which various aspects of the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, described above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet, or electronic digitizer, 164, a microphone 163, a keyboard 162 and pointing device 161, commonly referred to as mouse, trackball or touch pad. Other input devices not shown in FIG. 1 may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

An auxiliary display subsystem 199 may be connected via the user interface 160 to allow data such as program content, system status and event notifications to be provided to the user, even if the main portions of the computer system are in a low power state. The auxiliary display subsystem 199 may be connected to the modem 172 and/or network interface 170 to allow communication between these systems while the main processing unit 120 is in a low power state.

Selective Rendering for Driver Classes

Various aspects of the technology described herein are directed towards a technology that solves the blind spot problem, by selective filtering out mechanism/process that excludes the rendering primitives that corresponding to a class of driver such as an accessibility mirror driver. In general, this is accomplished via a mechanism/process that enables selective rendering and filtering based on window handles or the like. As will be understood, selective rendering allows combined screen magnifiers and readers to operate as desired, without implementing magnification rendering code in the display driver. Further, with this technology, multiple magnification surfaces may coexist, e.g., one on top of the other, and be correctly filtered out.

In one example implementation described herein, selective filtering of accessibility mirror drivers is described in the example context of a Windows®-based operating system architecture. However, as will be understood, the present invention is not limited to accessibility mirror drivers or Windows®-based operating systems, let alone any particular implementation or examples described herein. Instead, numerous ways to implement the present invention are feasible. For example, instead of filtering accessibility mirror drivers, the mechanism described herein may selectively exclude essentially any driver or class of drivers can be from obtaining certain drawing primitives, e.g., the filtering may be in effect for all drivers of a class of driver types such as accessibility mirror drivers, or more granular, including filtering based on the identities of individual drivers (i.e., any class can correspond to as little as one driver). As such, the present invention is not limited to any of the particular examples used herein, but rather may be used various ways that provide benefits and advantages in computing in general.

Figure 2:
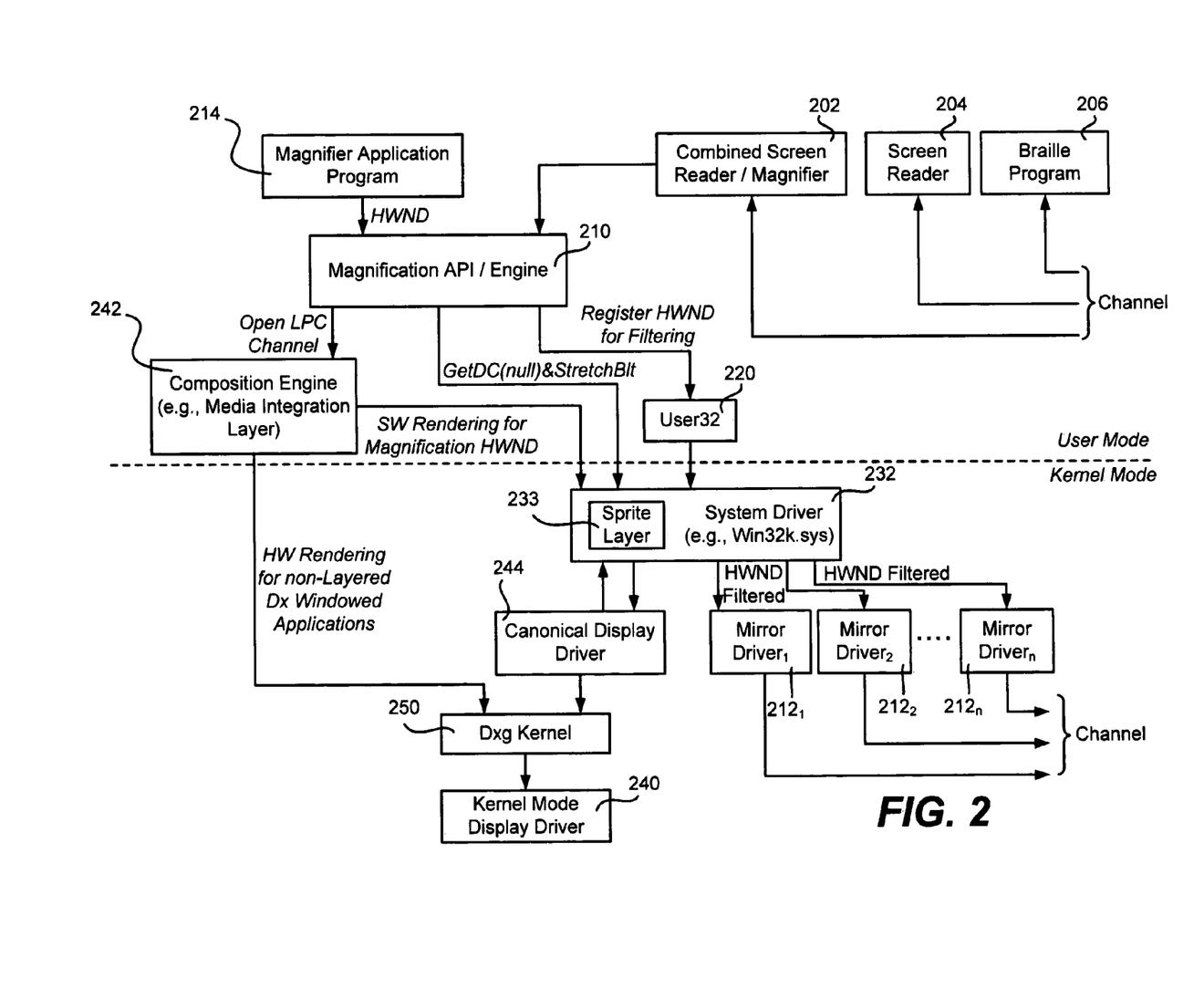
FIG. 2 is a block diagram representing an example architecture for selective filtering of primitives for magnification mirror drivers.

Turning to FIG. 2 of the drawings, accessibility-related programs such as magnifiers may include user mode programs such as a combined screen reader/magnifier program 202, a screen reader program 204, a Braille program 206 and/or other such programs. While three such programs are represented in FIG. 2, it is understood that this is only an example, and a typical user may have anywhere from one to any practical number of such programs operating.

In the example of FIG. 2, it is shown that the combined screen reader/magnifier 202 uses the magnification API/engine 210, as well as accessibility mirror driver technology, such as via the mirror driver$_1$ $212_1$. In general, accessibility mirror drivers generally allow accessibility technology vendors or the like to provide assistive technologies that work under a contemporary operating system (e.g., Windows® Vista™) driver model. The screen reader program 204 and a Braille program 206 are shown as using other mirror drivers, e.g., one among $212_2$-$212_n$. Moreover, a magnifier application program 214 is shown as using the magnification API/engine 210 to provide its magnification functionality.

For example, a mirror driver (e.g., $212_2$) may thus be associated with the screen reader 204, and/or a combined screen reader/magnifier 202 may be present. In general, accessibility vendors use DrvXXX primitives to build an off-screen model that is then used to describe objects on screen, e.g., using a text-to-speech engine or a Braille output mechanism/interface. Each accessibility vendor usually sends information from their off-screen model back to user mode where their applications (e.g., 202, 204 or 206) are running, such as represented in FIG. 2.

Thus, as can be seen, various types of programs may be implemented via the magnification API/engine 210, or implemented by using accessibility mirror drivers, or by a combination, both, and these types may coexist. For a combined application, such as the combined screen reader/magnifier 202 represented in FIG. 2, one code path may correspond to calls the magnification API/engine 210, and another may implement an accessibility mirror driver (e.g., $212_1$).

With respect to magnifier filtering for programs using the magnification API/engine 210, in general, the magnification API/engine 210 calls a register HWND function in e.g., (in a user32 component 220 such as User32p.lib) to register a HWND for each magnification window of a set of one or more magnification windows to be registered. An example of one such method, SetMagnifierWindow, is described below, and generally provides a way to enable or disable HWND-based filtering. As the magnification API/engine 210 supports multiple clients, filtering may be simultaneously enabled for multiple magnifier windows. In one implementation, the magnification API/engine 210 may be granted private (restricted) access as an operating system component to HWND registration. Note that for lifecycle management of HWND filtering, if a magnifier window is destroyed and the HWND is reused by another application window, then filtering is automatically disabled for that reused HWND.

With respect to filtering for a class of accessibility mirror drivers, in order to allow accessibility vendors to identify a driver as being of a type corresponding to an accessibility mirror driver, an associated attribute, such as a flag, may be used to distinguish this class of drivers from other drivers. As described below, magnifier HWNDs and their associated primitives are only filtered out from mirror drivers marked with this attribute/flag. The following describes an example of one such flag:

```
GCAPS2_EXCLUDELAYERED
Setting this flag is equivalent to a mirror display
driver self-identifying as an accessibility mirror
driver:
        #define GCAPS2_EXCLUDELAYERED  0x00000800
```

In the example of filtering primitives, mirror drivers that do not set this flag will receive drawing primitives for layered HWNDs.

In one implementation, graphics primitive filtering takes place for all magnifier HWNDs for all properly-flagged accessibility mirror drivers, regardless of ownership, e.g., if there are three magnifier HWNDs on the system and three drivers with a respective association, each driver would have the primitives of all three magnifier windows filtered out of its rendering stream. Such drivers would thus see only the primitives that render the screen graphics as if the magnifier windows were not active, e.g., to allow an off screen model to be built. In alternative implementations, filtering may be more granular, e.g., filtering could be such that each driver would have the primitives of some subset of the magnifier windows filtered out of its rendering stream, e.g., its own primitives only.

It should be noted that in general, filtering is only performed for layered top-level windows, and HWNDs are only associated with layered top-level windows. Because layered windows are required to be top-level windows, the use of layered top-level windows is effectively an over-determination of the window properties. If a window is not marked as layered, then this changes the clip region of the applications that are under the magnifier. If filtering was performed on non-layered windows, accessibility mirror drivers would not see the calls for clipped regions of the underlying applications, even if the magnifier calls above it were filtered out.

Turning to an explanation of registration, in the example represented in FIG. 2, consider a filtering mechanism for a magnifier application to mirror driver. The magnifier application calls CreateWindowEx, and sets the window to be layered, which are typical operations. The magnifier application then passes the HWND to the magnification API/engine 210. In turn, the magnification API/engine 210 registers the HWND for the magnifier window and enables filtering via a function (SetMagnifierWindow) exposed privately via the User32 component 220. In the example implementation, this function maps to an NTUser function (NTUserSetMirrorRendering) exposed by a system driver 232 (e.g., Win32k.sys), as described below. The NTUser function NTUserSetMirrorRendering activates filtering code in the system driver 232 (e.g., Win32k.sys) such as in its sprite layer 233.

With respect to filtering operations, whenever the sprite layer 233 is about to draw an update to sprites that are associated with the registered HWNDs and attached to an accessibility mirror driver (e.g., properly flagged as such), the sprite layer 233 checks a table or the like that it maintains to associate HWNDs with drivers; (recall that as described above, each accessibility mirror driver has identified itself as such, e.g., by implementing the specified GCAPS flag). If the HWND is registered for filtering, the sprite layer 233 ignores the update, that is, does not provide the primitives to the accessibility mirror driver or drivers associated with the HWND. This has the effect that the accessibility mirror driver receives the DrvXXX rendering primitives, excluding those that are associated with magnifier HWNDs. Note that the association information may be maintained in essentially any way that is appropriate; for example, in a straightforward implementation where all mirror drivers are excluded for any registered HWND, only two sets of data need be maintained, the HWND(s) and the associated driver(s) to be excluded. More elaborate mappings may, for example, associate only certain HWND(s) with only certain drivers, and there may be any number of such mappings.

Turning to an explanation of rendering, as also represented in FIG. 2, alternative rendering paths from the magnification API/engine 210 to the kernel mode display driver 240 may be used. In general, the magnification API/engine 210 checks to see if it can open the graphics stream, which is essentially an LPC channel to the media integration layer (MIL) composition engine 242. If a connection to the graphics stream cannot be opened, magnification is implemented via the Win32k.sys system driver 232 (e.g., via GetDC (null) and StretchBlt) as described below.

If a connection to the graphics stream can be opened, magnification is implemented using the composition engine 242 in either software or hardware rendering mode. More particularly, hardware rendering may occur when the magnifier window is not a layered window and other hardware requirements to compose in hardware are met. If so, the magnifier window will be rendered in hardware as a windowed Dx application. The composition engine 242 uses DxgKernel interfaces 250 to draw to the kernel mode display driver 240.

Software rendering is instead used by the composition engine 242 when the magnifier window is a layered window or other hardware requirements to compose in hardware are not met. In such a situation, the magnifier window is rendered in software to a surface which is composited by the GDI sprite layer in the system driver (e.g., Win32k.sys) 232, as generally described above.

In a situation where a connection to the graphics stream cannot be opened, the system driver (e.g., Win32k.sys) 232 calls DrvXXX functions implemented by a canonical display driver (CDD) 244. The canonical display driver 244 essentially implements a Windows® XP-type device driver interface, calls GDI support services in the system driver (Win32k.sys) 232 to render, and then draws to the display driver 240 via DxgKernel 250. Note that the canonical display driver 244, DxgKernel 250 and the display driver 240 are a secure path. Further note that the canonical display driver 244 essentially insulates other (e.g., Windows® Vista™-type) driver model display drivers from having to implement the Windows® XP-type device driver interface, and eliminate the need to avoid modifying Win32k.sys to work with a Dx interface, which other (e.g., Windows® Vista™-type) driver model display drivers support.

Figure 3:
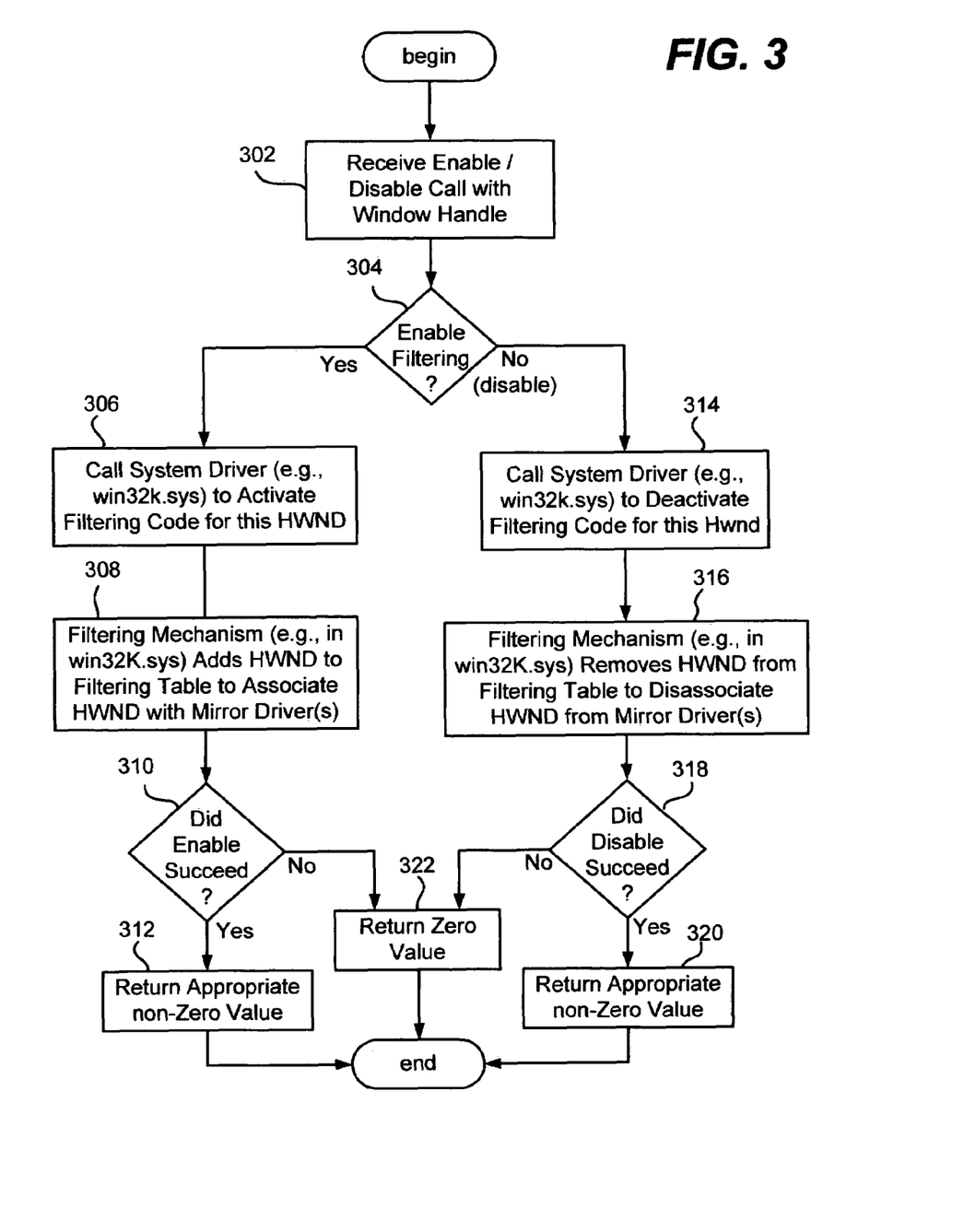
FIG. 3 is a flow diagram representing example steps to register a window for exclusion filtering.

FIG. 3 summarizes example steps in the registration process, beginning at step 302 where a request to enable or disable a window is received, along with the HWND for that window, e.g., via the SetMagnifierWindow function. If the parameter is set to enable filtering, step 304 branches to steps 306 and 308 to add the HWND to the table to associate the HWND with one or more drivers that are to have primitives filtered out. Step 310 and steps 312 or 322 are executed, depending on the success or failure of the registration. For example, in one implementation, if the function succeeds, the return value is nonzero, while if the function fails, the return value is zero (step 322). In this example, the function fails if the HWND references a window that is not marked with the layered window style, and/or if the HWND references a non top-level window such as a child window (which in this implementation automatically meets the previous condition since non top-level windows cannot be marked as layered windows).

Steps 314, 316, 318 and 322 represent the disabling operation, which is essentially similar. One additional error may be an attempt to de-register an HWND that was not registered.

FIG. 3 thus provides a straightforward mechanism for associating HWNDs with mirror drivers, as well as disassociating them. Note that more granular filtering can, for example, allow a parameter to be passed down that associates the HWND with a particular class or classes of drivers (e.g., of among possibly many different types) for filtering purposes. Further note that it is feasible to have a filtering model based on inclusion instead of exclusion, e.g., a driver only receives primitives corresponding to types for which an application window specifically registers.

Figure 4:
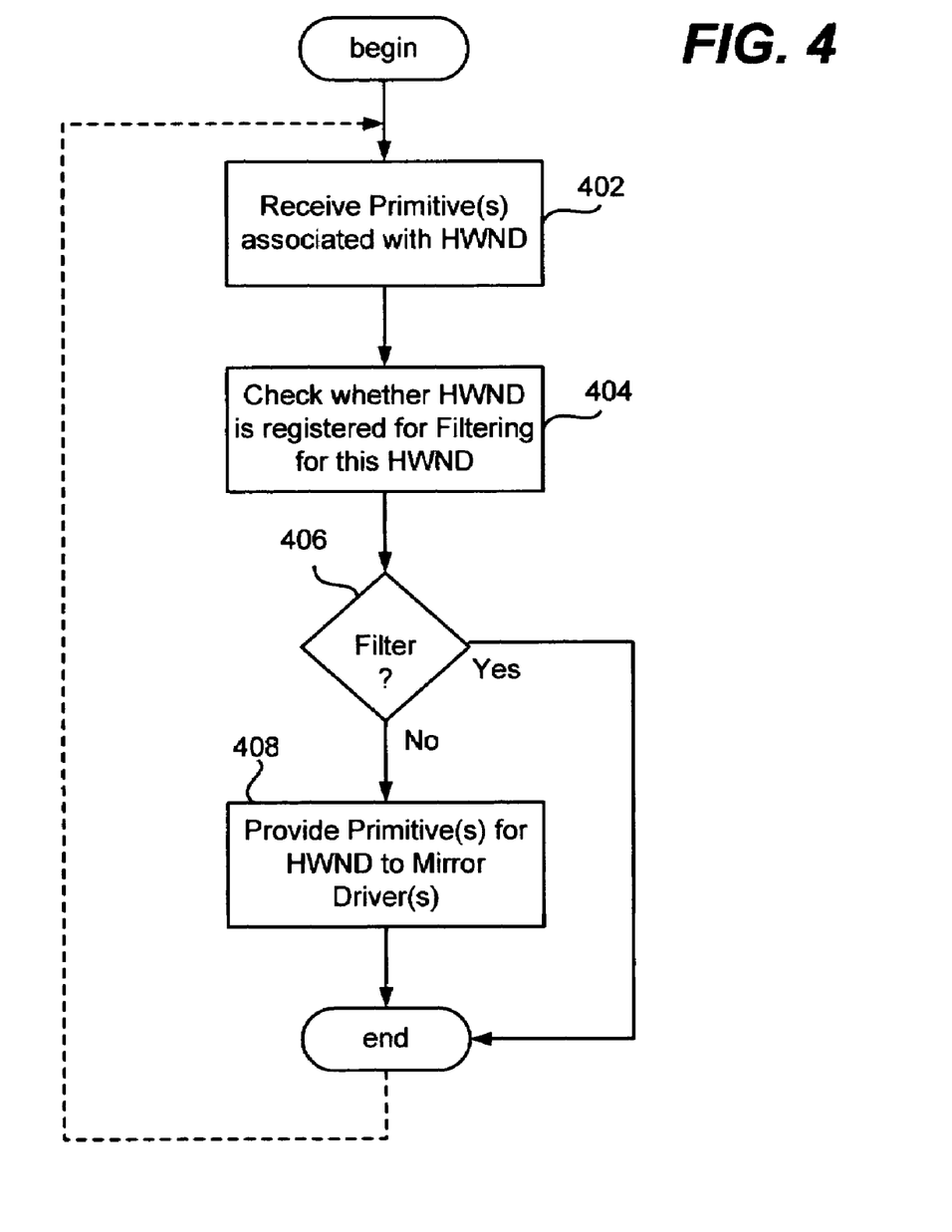
FIG. 4 is a flow diagram representing example steps to filter primitives based on registered information for the window and driver types.

FIG. 4 summarizes example steps in the filtering process, beginning at step 402 where a set of one or more primitives are received that are associated with an HWND. Steps 404 and 406 represent checking the registration status of this HWND with respect to filtering. If not filtered, step 408 provides the primitives to the mirror driver or drivers that were appropriately flagged, otherwise this step is skipped so that the mirror drivers never receive them. The dashed line represents the filtering process being repeated for subsequent HWND's primitive(s) sets.

While the above examples primarily focused on selective filtering for magnification purposes and the like, it should be noted that selective filtering for other applications may also be used. For example, for security purposes, certain drivers may be prevented via filtering (e.g., particularly via inclusion filtering, i.e., only included drivers will receive a window's primitives) from receiving the primitives corresponding to another window. For example, a window may specify that only a certain driver (e.g., digitally signed) can receive its primitives. Note that filtering may need to be performed in locations other than in the system driver 232 to enforce such filtering.

Example Interfaces, Functions and Code

HWND Registration Function in User32:

SetMagnifierWindow

The magnification API will call this function to register a magnifier HWND and enable or disable filtering for the HWND.

```
BOOL SetMagnifierWindow(
    HWND hwnd,          // handle to a magnifier window
    BOOL bSetFilter     // specifies if filtering is enabled
);
```

Parameters

HWND hwnd

[in] Handle to a layered magnification window

BOOL bSetFilter

[in] Specifies if filtering is enabled for the hwnd

Return Values

Success

If the function succeeds, the return value is nonzero.

Failure

If the function fails, the return value is zero. The function should fail if the HWND references a window that is not marked with the layered window style, and/or if the HWND references a non top-level window such as a child window. This rolls up into the previous condition since non top-level windows cannot be marked as layered windows.

Access Modifiers

The function is exposed privately via User32p.lib. The magnification API is an operating system component.

Multiple Calls to SetMagnifierWindow

This function can be called multiple times to register more than one HWND. This enables the usage scenario of multiple magnifier windows since filtering will be performed for all such magnifier windows. If a call is made to register an HWND that has previously been registered, the call should succeed if all other success conditions apply. This is plausible scenario since HWNDs can be reused by the system.

Mapping to NTUser in User32.def

The function exposed privately by User32 essentially references NTUser functions:

SetMagnifierWindow

DisableMirrorRendering

EnableMirrorRendering

SetMirrorRendering

This function is called via SetMagnifierWindow.

```
BOOL SetMirrorRendering(
    IN HWND hwnd,
    Bool bSetFilter
);
```

DisableMirrorRendering

This function may be called by SetMirrorRendering, depending on the bSetFilter argument (that is, when disabled).

```
BOOL DisableMirrorRendering(
    IN HWND hwnd)
{
    retval = InternalDisableMirrorRendering (hwnd);
}
```

EnableMirrorRendering

This function is called by SetMirrorRendering depending on the bSetFilter argument (that is, when enabled).

```
BOOL EnableMirrorRendering(
    IN HWND hwnd)
{
    retval = InternalEnableMirrorRendering (hwnd);
}
```

Drawing for layered windows is handled in the sprite layer. The sprite layer code ignores updates to a sprite if the sprite is attached to an accessibility mirror driver. The sprite HWND needs to be marked as an accessibility HWND:

```
BOOL TgnoreMirrorupdate (SPRITE *pSprite)
{
    if (Valid pSprite & &
        pSprite has to be excluded from Mirror & &
        Drawing to a mirror device & &
        Mirror device marked for layered exclude)
    {
        return TRUE;
    }
    return FALSE;
}
BOOL InternalDisableMirrorRendering (HWND hwnd)
{
    pSprite = GetSprite (hwnd) ;
    Remove exclude from mirror bit from pSprite
    return TRUE;
}
BOOL InternalEnableMirrorRendering (HWND hwnd)
{
    pSprite = GetSprite (hwnd) ;a
    Add exclude from mirror bit to pSprite
    return TRUE;
}
```

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A method implemented by a computing system that includes a processor and memory storing executable instructions for implementing the method, the method comprising:
   the computing system maintaining first data that identifies each driver of a class comprising one or more drivers;
   the computing system maintaining second data that identifies a window that is associated with the class;
   the computing system receiving graphics primitives associated with the window; and
   the computing system filtering the graphics primitives based on the first and second data to prevent the graphics primitives for the window from being sent to any driver of the class.

2. The method of claim 1 wherein the class corresponds to at least one accessibility mirror driver.

3. The method of claim 1 wherein maintaining the first data comprises detecting an attribute associated with a driver of the class.

4. The method of claim 1 wherein maintaining the second data comprises receiving a registration request that identifies the window via a window handle.

5. The method of claim 1 wherein filtering the graphics primitives based on the first and second data comprise excluding the graphics primitives when the first data corresponds the second data.

6. The method of claim 1 wherein the first data corresponds to a plurality of drivers and the second data corresponds to a plurality of windows, and wherein excluding the graphics primitives comprises excluding the graphics primitives from every driver corresponding to the first data from receiving the graphics primitives for any window that corresponds to the second data.

7. The method of claim 1 wherein filtering the graphics primitives based on the first and second data comprise including primitives only when the first data corresponds the second data.

8. In a computing environment, a system comprising:
   a registration mechanism that maintains registration information comprising an identifier of a graphics window, to associate that identifier with a driver class comprising one or more drivers;
   a detection mechanism that detects whether a driver belongs to a particular driver class; and
   a filtering mechanism that selectively controls whether graphics primitives are provided to a given driver based on a window identifier associated with the graphics primitives, the registration information, and whether that given driver belongs to the particular driver class.

9. The system of claim 8 wherein the identifier of the graphics window comprises a window handle associated with a window of an accessibility program.

10. The system of claim 8 wherein the particular driver comprises an accessibility mirror driver that belongs to an accessibility mirror driver class.

11. The system of claim 10 wherein the accessibility mirror driver is associated with an attribute that indicates to the detection mechanism that the accessibility mirror driver belongs to the accessibility mirror driver class.

12. The system of claim 10 wherein the filtering mechanism is incorporated into a sprite layer of a kernel mode system driver.

13. The system of claim 8 further comprising a canonical display driver that does not belong to the particular driver class, and wherein the filtering mechanism that selectively controls the graphics primitives does not exclude graphics primitives from being provided to the canonical display driver, and excludes graphics primitives that are associated with the graphics window that is identified in the registration information from being provided to any driver of the driver class associated with that graphics window.

14. A computer-readable storage medium having stored computer-executable instructions, which when executed perform steps, comprising:
   receiving a registration request to register a window;
   registering the window, including maintaining information about the registered window and any other similarly registered window or windows; and
   when a set of one or more primitives are received that correspond to a specified window, making a determination from the information as to whether the specified window comprises a registered window, and determining whether to provide the set of one or more primitives to a driver class based on the determination.

15. The computer-readable storage medium of claim 14, wherein the stored computer-executable instructions, when executed, further perform the following:
   maintaining information identifying at least one driver of the driver class.

16. The computer-readable storage medium of claim 14, wherein the stored computer-executable instructions, when executed, further perform the following:
   determining whether a driver includes an attribute that associates the driver with the driver class.

17. The computer-readable storage medium of claim 14 wherein when the specified window comprises a registered window, the primitives are not provided to any driver of the driver class.

18. The computer-readable storage medium of claim 14, wherein the stored computer-executable instructions, when executed, further perform the following:
   receiving a request to de-register the window, and in response, deregistering the window.

19. A computer storage media comprising computer executable instructions for implementing the method recited in claim 1.

20. The computer storage media recited in claim 19, wherein the storage media is system memory of a computing system.

* * * * *

UNITED STATES PATENT AND TRADEMARK OFFICE
CERTIFICATE OF CORRECTION

| | | |
|---|---|---|
| PATENT NO. | : 7,619,622 B2 | |
| APPLICATION NO. | : 11/395684 | |
| DATED | : November 17, 2009 | |
| INVENTOR(S) | : Jeremy de Souza et al. | |

It is certified that error appears in the above-identified patent and that said Letters Patent is hereby corrected as shown below:

In column 14, line 1-2, in Claim 19, delete "computer executable" and insert
-- computer-executable --, therefor.

Signed and Sealed this
Eighteenth Day of January, 2011

David J. Kappos
*Director of the United States Patent and Trademark Office*